United States Patent [19]

Fahmy

[11] Patent Number: 5,700,570

[45] Date of Patent: Dec. 23, 1997

[54] COMPOSITE CONSTRUCTION MATERIAL

[75] Inventor: Mohamed A. Fahmy, Portage, Mich.

[73] Assignee: K2, Inc., Adrian, Mich.

[21] Appl. No.: 599,947

[22] Filed: Feb. 14, 1996

[51] Int. Cl.⁶ .................................................. B32B 23/08

[52] U.S. Cl. ........................... 428/342; 428/511; 428/512; 428/513; 428/514; 428/537.5

[58] Field of Search .................................. 428/141, 513, 428/514, 511, 537.5, 512, 341, 342

[56] References Cited

U.S. PATENT DOCUMENTS

| 5,187,000 | 2/1993 | Chow et al. | 428/141 |
| 5,328,749 | 7/1994 | Noda et al. | 428/195 |

Primary Examiner—E. Rollins Buffalow
Attorney, Agent, or Firm—Donald R. Fraser

[57] ABSTRACT

A composite construction material comprises consecutive laminae of a kraft linerboard optionally coated with a sealant, a layer of polymer, a plurality of superposed layers of water-resistant paperboard adhered together, a second layer of polymer, and a second layer of kraft linerboard.

16 Claims, 1 Drawing Sheet

COMPOSITE CONSTRUCTION MATERIAL

FIELD OF INVENTION

This invention relates generally to a composite construction material. More particularly, the invention is directed to a multi-layered laminated composite construction material useful as a wall component. The inventive material may be treated as a conventional wall component, e.g., it may be painted or covered with wallpaper. More importantly, the inventive wall construction material may be recycled, unlike conventional wall components such as plasterboard, drywall, wall board, plywood, and the like.

BACKGROUND OF THE INVENTION

Composite construction materials are widely used in the building and allied industries as wall components or panels, for dividing the interior space within a building, or providing a large vertical surface which may be decorated, e.g., to prepare a theatrical studio set. Such construction materials generally comprise wallboard, dry wall, plywood, asbestos board, plasterboard, gypsum, and the like. These conventional materials cannot be reused or recycled, and therefore must be discarded when removed from their structural framework. Additionally, such conventional materials are supplied as large sheets which are heavy and cumbersome, making their use and eventual removal difficult.

It would be desirable to prepare a construction material which is light-weight yet substantially rigid, and which is recyclable following its removal from a structural framework.

SUMMARY OF THE INVENTION

Accordant with the present invention, there has surprisingly been discovered a composite construction material which is light-weight yet substantially rigid; and which may be recycled. The composite construction material comprises: a first layer of kraft linerboard, optionally having a sealant on a surface thereof; a plurality of superposed layers of water-resistant paperboard, the layers of water-resistant paperboard adhered together by means of layers of an adhesive positioned intermediate and contacting the layers of water-resistant paperboard; a first polymer layer intermediate and adhered to the first layer of kraft linerboard and the plurality of superposed layers of water-resistant; a second layer of kraft linerboard; and a second polymer layer intermediate and adhered to the second layer of kraft linerboard and the plurality of superposed layers of water-resistant paperboard.

The inventive composite construction material according to the present invention is particularly useful as a wall component, for dividing the interior space within a building or providing a large vertical surface which may be decorated.

DETAILED DESCRIPTION OF THE PREFERRED EMBODIMENT

Figure 1:
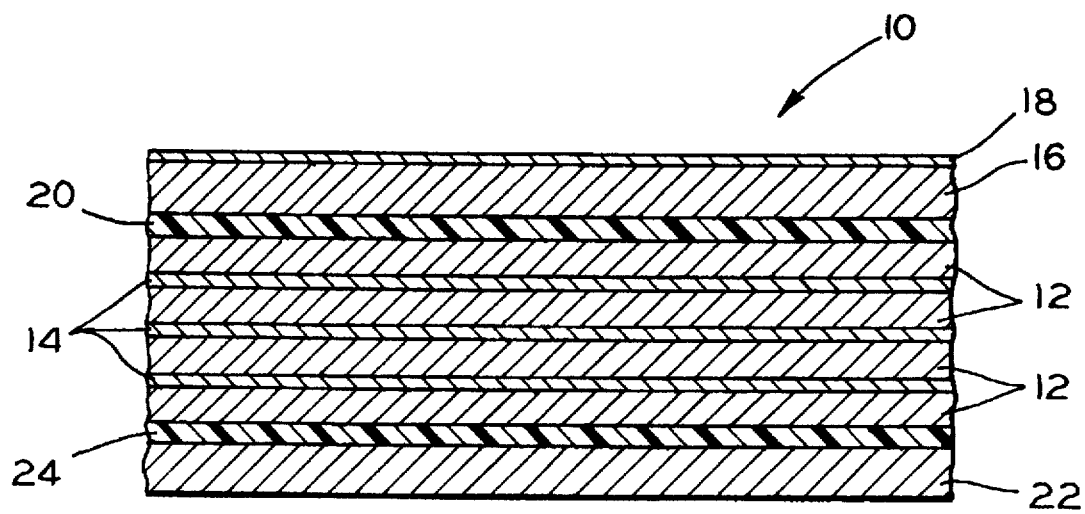
FIG. 1 is a schematic representation of an elevation view of a composite construction material embodying the features of the present invention.

Referring now to FIG. 1, there is shown generally at 10 a schematic representation of the composite construction material according to the present invention. The composite construction material 10 comprises multiple layers (four layers in the illustrated embodiment) of water-resistant paperboard 12 adhered together by intermediate layers of an adhesive 14. A first layer of kraft linerboard 16, having a sealant 18 on the exposed major surface thereof, is adhered to one of the layers of water-resistant paperboard 12 by means of a first polymer layer 20 therebetween. A second layer of kraft linerboard 22 is adhered to another one of the layers of water-resistant paperboard 12 by means of a second polymer layer 24 therebetween.

The first and second layers of kraft linerboard are well-known materials conventionally used to manufacture laminated materials. Kraft linerboard is a relatively inexpensive, generally stiff paper product made primarily from pine by digestion with a mixture of caustic soda, sodium sulfate, sodium carbonate, and sodium sulfide. It may additionally contain conventional paper adjuvants such as, for example, strength increasing agents, sizing agents, such as, for example, paste rosin, liquid rosin, dispersed rosin, alkyl ketene dimer (AKD), alkenyl succinic anhydride (ASA), styrene maleic anhydride, wax emulsion and latex polymer emulsions, preservatives, fillers, clays, kaolin, talc, barium sulfate, calcium carbonate, etc. The weight of the kraft linerboard may vary over wide limits from about 26 to about 90 pounds per thousand square feet (#/MSF). A preferred kraft linerboard has a weight of about 62 #/MSF and may be obtained from Tenneco Packaging under the product designation 62# kraft linerboard with full wet strength.

The sealant may be applied during manufacture or at the point of use and comprises any water-based or organic substance that can be applied to the exposed major surface of the kraft linerboard, which is capable of forming a monolithic protective layer over the kraft linerboard to exclude particulates and moisture therefrom. Useful sealants include, but are not necessarily limited to, water-based materials such as, for example, soluble silicates, phosphate cements, and the like, and synthetic polymers such as, for example, silicates, urethanes, acrylics, polychloroprenes, etc. The sealant may alternatively comprise a natural material such as linseed oil or a wax. A preferred sealant is an opaque water-based coating which is available from Flint Ink Corporation under the product designation RIW 01549.

The first and second polymer layers according to the present invention may be prepared from polymers which include, but are not necessarily limited to, low, medium, or high density polyethylene, polypropylene, polyesters, polyurethanes, acrylics, polyethers, polyamides, polyvinyl acetate, polyvinyl chloride, styrenics, polybutadiene, and polycarbonates, copolymers of ethylene and/or propylene with one or more copolymerizable monomers such as, for example, styrene, vinyl acetate, acrylic acid, methacrylic acid, methyl methacrylate, butadiene, isoprene, etc., as well as blends and copolymers of these materials. The weight of each of the first and second polymer layers may vary over wide limits from about 2 to about 20 #/MSF, and preferably each has a weight of about 5 #/MSF. A preferred polymer for preparing the first and second polymer layers comprises a low density polyethylene available from Chevron Chemicals under the product designation LDPE 1017. The first and second polymer layers may be the same, or may be different.

The water-resistant paperboard layers may be prepared by conventional paper-making technique. Such paperboard materials, which are generally thicker and more rigid than typical papers, are made water-resistant by the application thereto of a material such as, for example, a starch, gelatin, casein, gums, oils, waxes, silicanes, resins, a water-soluble polymer, and the like, as well as mixtures thereof. A preferred water-resistant paperboard product is available from Simplex Products Division, Anthony Industries under the product designation Hi-sized chip board.

The adhesive which bands the layers of water-resistant paperboard together may comprise a synthetic organic material such as polyvinyl alcohol, an elastomer-solvent cement, a thermoplastic resin such as polyethylene, isobutylene, polyamide, etc., a thermosetting resin such as an epoxy, phenolformaldehyde, polyvinyl butyral, cyanoacrylate, etc., or a natural organic material such as rubber latex, terpene resin, and the like, as well as mixtures thereof. A preferred adhesive is a polyvinyl alcohol which may be obtained from Air Products and Chemicals Inc. under the product designation Airvol 321.

Figure 2:
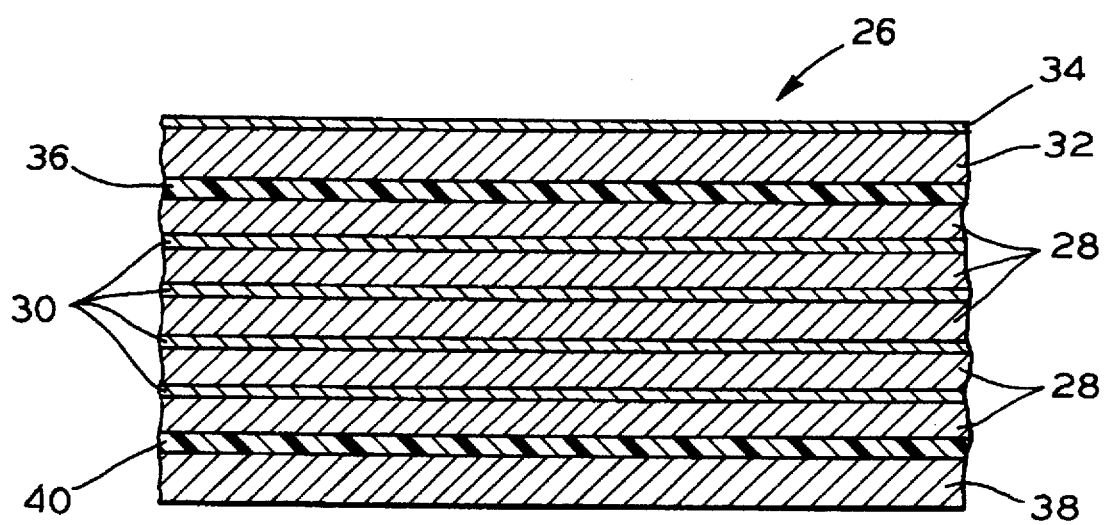
FIG. 2 is a schematic representation of an elevation view of an alternative embodiment of the composite construction material according to the present invention.

In an alternative embodiment illustrated in FIG. 2, there is shown generally at 26 a schematic representation of composite construction material according to the present invention. Five layers of water-resistant paperboard 28 are adhered together by intermediate layers of an adhesive 30, a first layer of kraft linerboard 32, having a sealant 34 on the exposed major surface thereof, is adhered to one of the layers of water-resistant paperboard 28 by means of a first polymer layer 36 therebetween. A second layer of kraft linerboard 38 is adhered to another one of the layers of water-resistant paperboard 28 by means of a second polymer layer 40 therebetween.

The various components of the composite construction material are assembled, then laminated together by conventional means to form the final product. In a preferred process, the first layer of kraft linerboard is adhered to a layer of water-resistant paperboard by laminating the first polymer layer therebetween. This is accomplished utilizing conventional lamination equipment well-known in the industry. Heat and pressure causes the first polymer layer to bond to both the first layer of kraft linerboard and to the layer of water-resistant paperboard.

A layer of an opaque, water-based sealant is thereafter applied to the exposed surface of the first layer of kraft linerboard using a conventional roll coater.

The second layer of kraft linerboard is likewise adhered to a layer of water-resistant paperboard by laminating the second polymer layer therebetween, again by conventional lamination techniques utilizing heat and pressure.

Superposed additional layers of water-resistant paperboard are positioned between the layer of water-resistant paperboard adhered to the first layer of kraft linerboard. Thereafter, an adhesive is interposed between adjacent layers of water-resistant paperboard, and the entire assemblage is laminated by well-known techniques utilizing heat and pressure to form the composite construction material according to the present invention. As will be readily apparent to one ordinarily skilled in the art, the process for manufacturing the composite construction material of the present invention may be practiced as a continuous lamination process by utilizing uninterrupted running webs of kraft linerboard, water-resistant paperboard, and polymer with appropriate coating techniques for applying the sealant and layer of adhesive. Thereafter, the composite construction material may be cut to appropriately sized panels for use as building interior wall components or vertical surfaces which may be painted or decorated in order to produce a theatrical studio set.

The combination of the sealant, thickness of the kraft linerboard, and layers of polymeric material provide for controlled absorbency of paints, coatings, and wall covering adhesives. Thus, the composite construction material according to the present invention is receptive to, e.g., paints without compromising its stiffness and integrity. It has sufficient strength to allow it to be nailed in a conventional fashion to wooden studs. Moreover, the second layer of kraft linerboard provides proper surface characteristics for adhering the composite construction material to other substrates, e.g., plywood using water- or organic-based adhesives.

Finally, the composite construction material according to the present invention may be recycled. Unlike conventional wall components which must be discarded, the inventive composite construction material may be removed, ground, and re-pulped to produce a polymer-containing paperboard material.

From the foregoing description, one ordinarily skilled in the art may easily ascertain the essential characteristics of this invention and, without departing from its spirit or scope, can make various changes and modifications to adapt the invention to uses and conditions. For example, while FIGS. 1 and 2 illustrate the use of four and five consecutive layers of water-resistant paperboard, the invention contemplates any number of layers greater than one, depending on the thickness and rigidity desired for the final product.

What is claimed is:

1. A composite construction material, comprising:
   a first layer of kraft linerboard, optionally having a sealant on a surface thereof;
   a plurality of superposed layers of water-resistant paperboard, said layers of water-resistant paperboard adhered together by means of layers of an adhesive positioned intermediate and contacting said layers of water-resistant paperboard;
   a first polymer layer intermediate and adhered to the first layer of kraft linerboard and the plurality of superposed layers of water-resistant paperboard;
   a second layer of kraft linerboard; and
   a second polymer layer intermediate and adhered to the second layer of kraft linerboard and the plurality of superposed layers of water-resistant paperboard.

2. The composite construction material according to claim 1, wherein the weight of the first layer of kraft linerboard is about 62 pounds per thousand per thousand feet.

3. The composite construction material according to claim 2, wherein the sealant is a water-based sealant.

4. The composite construction material according to claim 1, wherein the plurality of superposed layers of water-resistant paperboard comprises four layers of water-resistant paperboard.

5. The composite construction material according to claim 1, wherein the plurality of superposed layers of water-resistant paperboard comprises five layers of water-resistant paperboard.

6. The composite construction material according to claim 1, wherein the adhesive is a polyvinyl alcohol.

7. The composite construction material according to claim 1, wherein the first polymer layer is a low density polyethylene.

8. The composite construction material according to claim 1, wherein the first polymer layer has a weight of about 5 pounds per thousand square feet.

9. The composite construction material according to claim 1, wherein the second layer of kraft linerboard has a weight of about 62 pounds per thousand square feet.

10. The composite construction material according to claim 1, wherein the second polymer layer is a low density polyethylene.

11. The composite construction material according to claim 1, wherein the second polymer layer has a weight of about 5 pounds per thousand square feet.

12. The composite construction material according to claim 1, wherein the first and second polymer layers are the same.

13. The composite construction material according to claim 1, wherein the first and second polymers are different.

14. A composite construction material, comprising:
- a first layer of kraft linerboard having a weight of about 62 pounds per thousand square feet, said first layer of kraft linerboard optionally having a water-based sealant on a surface thereof;
- a plurality of superposed layers of water-resistant paperboard, said layers of water-resistant paperboard adhered together by means of layers of a polyvinyl alcohol adhesive positioned intermediate and contacting said layers of water-resistant paperboard;
- a first layer of low density polyethylene having a weight of about 5 pounds per thousand square feet intermediate and adhered to the first layer of kraft linerboard and the plurality of superposed layers of water-resistant paperboard;
- a second layer of kraft linerboard having a weight of about 62 pounds per thousand square feet; and
- a second layer of low density polyethylene having a weight of about 5#/MSF intermediate and adhered to the second layer of kraft linerboard and the plurality of superposed layers of water-resistant paperboard.

15. The composite construction material according to claim 14, wherein the plurality of superposed layers of water-resistant paperboard comprises four layers of water resistant paperboard.

16. The composite construction material according to claim 14, wherein the plurality of superposed layers of water-resistant paperboard comprises five layers of water resistant paperboard.

* * * * *